US012689488B2

(12) United States Patent
Xiao et al.

(10) Patent No.: US 12,689,488 B2
(45) Date of Patent: Jul. 21, 2026

(54) METHODS AND APPARATUSES FOR MAPPING FROM VRB TO PRB

(71) Applicant: Lenovo (Beijing) Limited, Beijing (CN)

(72) Inventors: Lingling Xiao, Beijing (CN); Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 305 days.

(21) Appl. No.: 18/693,457

(22) PCT Filed: Sep. 30, 2021

(86) PCT No.: PCT/CN2021/122310
§ 371 (c)(1),
(2) Date: Mar. 19, 2024

(87) PCT Pub. No.: WO2023/050356
PCT Pub. Date: Apr. 6, 2023

(65) Prior Publication Data
US 2025/0141631 A1 May 1, 2025

(51) Int. Cl.
*H04W 4/00* (2018.01)
*H04L 5/00* (2006.01)
*H04W 72/1273* (2023.01)

(52) U.S. Cl.
CPC .......... *H04L 5/0053* (2013.01); *H04L 5/0044* (2013.01); *H04W 72/1273* (2013.01)

(58) Field of Classification Search
CPC .. H04W 72/1273; H04W 72/04; H04W 72/20
See application file for complete search history.

(56) References Cited

U.S. PATENT DOCUMENTS

| | | | |
|---|---|---|---|
| 2020/0351847 A1 | 11/2020 | Kim et al. | |
| 2022/0046670 A1* | 2/2022 | Lin | H04L 5/0053 |
| 2022/0191841 A1* | 6/2022 | Abdoli | H04L 1/0046 |

FOREIGN PATENT DOCUMENTS

| | | |
|---|---|---|
| WO | 2019192422 A1 | 10/2019 |
| WO | 2021163408 A1 | 8/2021 |

OTHER PUBLICATIONS

"Foreign Office Action", EP Application No. 21958928.0, May 21, 2025, 10 pages.

(Continued)

*Primary Examiner* — Omoniyi Obayanju
(74) *Attorney, Agent, or Firm* — FIG. 1 Patents

(57) ABSTRACT

Embodiments of the present disclosure relate to methods and apparatuses for mapping from virtual resource block (VRB) to physical resource block (PRB) of a physical downlink shared channel (PDSCH) transmission. According to an embodiment of the present disclosure, a user equipment can include: a receiver that receives a downlink control information (DCI) format 1_0 in two or more linked common search spaces (CSSs) associated with two or more control resource sets (CORESETs), wherein each CSS of the two or more linked CSSs is associated with a CORESET of the two or more CORESETs; and a processor that is coupled to the receiver and determines a lowest-numbered PRB in the two or more CORESETs for mapping from VRB to PRB of a PDSCH transmission scheduled by the DCI format 1_0.

20 Claims, 3 Drawing Sheets

(56)           References Cited

OTHER PUBLICATIONS

Huawei , "On VRB-to-PRB interleaving for SIB transmission", 3GPP TSG RAN WG1 Meeting #94, R1-1809328, Gothenburg, Sweden, Aug. 20-24, 2018, retrieved from the internet on Jun. 9, 2024, <https://www.3gpp.org/ftp/tsg_ran/WG1_RL1/TSGR1_94/Docs>, Aug. 20, 2018, 7 pages.

LG Electronics , "Summary #2 of PDSCH/PUSCH enhancements (Scheduling/HARQ)", 3GPP TSG RAN WG1 #106-e, R1-2108333, e-Meeting, Aug. 16-27, 2021, retrieved from the internet on Jun. 9, 2024, <https://www.3gpp.org/ftp/TSG_RAN/WG1_RL1/TSGR1_106-e/Docs/>, Aug. 16, 2021, 55 pages.

LG Electronics , "Summary #3 of PDSCH/PUSCH enhancements (Scheduling/HARQ)", 3GPP TSG RAN WG1 #106-e, R1-2108370, e-Meeting, Aug. 16-27, 2021, retrieved from the internet on Jun. 9, 2024, <https://www.3gpp.org/ftp/TSG_RAN/WG1_RL1/TSGR1_106-e/Docs/>, Aug. 16, 2021, 104 pages.

PCT/CN2021/122310 , "International Preliminary Report on Patentability", International Application No. PCT/CN2021/122310, 4 pages.

PCT/CN2021/122310 , "International Search Report and Written Opinion", PCT International Application No. PCT/CN2021/122310, Jun. 29, 2022, 6 pages.

Qualcomm Incorporated , "Summary #1 of email discussions [106-e-NR-feMIMO-03] for mTRP PDCCH enhancements", 3GPP TSG-RAN WG1 Meeting #106-e, R1-2108254, e-Meeting, Aug. 16-Aug. 27, 2021, retrieved from the internet on Jun. 9, 2024, <https://www.3gpp.org/ftp/TSG_RAN/WG1_RL1/TSGR1_106-e/Docs/>, Aug. 27, 2021, 74 pages.

\* cited by examiner receiving a DCI format
1_0 in two or more linked
CSSs associated with two
or more CORESETs    201 determining a lowest-
numbered PRB in the two
or more CORESETs for
mapping from VRB to PRB
of a PDSCH transmission    203 transmitting a DCI format 1_0 in two or more linked CSSs associated with two or more CORESETs — 501 determining a lowest-numbered PRB in the two or more CORESETs for mapping from VRB to PRB of a PDSCH transmission — 503

600 transmitter 602 receiver 604 processor 606

METHODS AND APPARATUSES FOR MAPPING FROM VRB TO PRB

TECHNICAL FIELD

Embodiments of the present application generally relate to wireless communication technology, and in particular to methods and apparatuses for mapping from virtual resource block (VRB) to physical resource block (PRB) of a physical downlink shared channel (PDSCH) transmission.

BACKGROUND

Multiple transmit-receive point (M-TRP) based transmission has been introduced into New Radio (NR). In NR Rel-17, it is proposed to identify and specify features to improve reliability and robustness for channels besides a PDSCH, e.g., physical downlink control channel (PDCCH), physical uplink shared channel (PUSCH), and physical uplink control channel (PUCCH), using multiple transmit-receive points (TRPs) and/or multiple panels, with Rel-17 reliability features.

In Rel-16, downlink control information (DCI) for scheduling a PDSCH transmission may be transmitted in a common search space (CSS) associated with a control resource set (CORESET). In some cases, for example, when a PDSCH transmission is scheduled by a DCI format 1_0 in a CSS, the mapping rule from VRB(s) to PRB(s) of the PDSCH transmission may be related to the lowest-numbered PRB in the CORESET where the DCI scheduling the PDSCH transmission was received.

In Rel-17, DCI for scheduling a PDSCH transmission may be transmitted in two or more linked CSSs (which is also referred to as evolved PDCCH (e-PDCCH) mode), wherein each CSS is associated with a corresponding CORESET. The lowest-numbered PRBs in the different CORESETs associated with the two or more linked CSSs may be different. In such cases, how to determine the lowest-numbered PRB in the CORESETs for mapping from VRB to PRB of the PDSCH transmission needs to be addressed.

Given the above, it is desirable to provide improved solutions for mapping from VRB to PRB of a PDSCH transmission to address the above issues.

SUMMARY OF THE APPLICATION

Some embodiments of the present application provide technical solutions for mapping from VRB to PRB of a PDSCH transmission scheduled by a DCI format 1_0 in an e-PDCCH mode.

Some embodiments of the present application provide a user equipment (UE), including: a receiver that receives a DCI format 1_0 in two or more linked CSSs associated with two or more CORESETs, wherein each CSS of the two or more linked CSSs is associated with a CORESET of the two or more CORESETs; and a processor that is coupled to the receiver and determines a lowest-numbered PRB in the two or more CORESETs for mapping from VRB to PRB of a PDSCH transmission scheduled by the DCI format 1_0.

In some embodiments of the present application, the lowest-numbered PRB is a lowest-numbered PRB in one CORESET of the two or more CORESETs determined based on a pre-defined rule.

In some embodiments of the present application, the one CORESET is a CORESET with a lowest CORESET identity (ID) or a highest CORESET ID among the two or more CORESETs.

In some embodiments of the present application, the one CORESET is a CORESET associated with a CSS with a lowest CSS ID or a highest CSS ID among the two or more linked CSSs.

In some embodiments of the present application, the one CORESET is a CORESET associated with a lowest lowest-numbered PRB or a highest lowest-numbered PRB in the two or more CORESETs.

In some embodiments of the present application, the receiver further receives configuration information configuring a CSS set containing the two or more linked CSSs, and the one CORESET is a CORESET associated with a first CSS or a last CSS in the CSS set.

In some embodiments of the present application, the receiver further receives configuration information of one CSS of the two or more linked CSSs which contains the CSS ID(s) of the other CSS(s) of the two or more linked CSSs, and the one CORESET is a CORESET associated with the one CSS.

In some embodiments of the present application, the one CORESET is a CORESET associated with a reference PDCCH candidate, wherein the reference PDCCH candidate is a PDCCH candidate where the DCI format 1_0 is received and having a latest end symbol or an earliest start symbol in time domain.

In some embodiments of the present application, the receiver further receives configuration information configuring a same lowest-numbered PRB for all of the two or more CORESETs, and the lowest-numbered PRB is the same lowest-numbered PRB.

Some other embodiments of the present application provide a base station (BS), including: a transmitter that transmits a DCI format 1_0 in two or more linked CSSs associated with two or more CORESETs for scheduling a PDSCH transmission, wherein each CSS of the two or more linked CSSs is associated with a CORESET of the two or more CORESETs; and a processor that is coupled to the transmitter and determines a lowest-numbered PRB in the two or more CORESETs for mapping from VRB to PRB of the PDSCH transmission scheduled by the DCI format 1_0.

In some embodiments of the present application, the lowest-numbered PRB is a lowest-numbered PRB in one CORESET of the two or more CORESETs determined based on a pre-defined rule.

In some embodiments of the present application, the one CORESET is a CORESET with a lowest CORESET ID or a highest CORESET ID among the two or more CORESETs.

In some embodiments of the present application, the one CORESET is a CORESET associated with a CSS with a lowest CSS ID or a highest CSS ID among the two or more linked CSSs.

In some embodiments of the present application, the one CORESET is a CORESET associated with a lowest lowest-numbered PRB or a highest lowest-numbered PRB in the two or more CORESETs.

In some embodiments of the present application, the transmitter further transmits configuration information configuring a CSS set containing the two or more linked CSSs, and the one CORESET is a CORESET associated with a first CSS or a last CSS in the CSS set.

In some embodiments of the present application, the transmitter further transmits configuration information of one CSS of the two or more linked CSSs which contains the CSS ID(s) of the other CSS(s) of the two or more linked CSSs, and the one CORESET is a CORESET associated with the one CSS.

In some embodiments of the present application, the one CORESET is a CORESET associated with a reference PDCCH candidate, wherein the reference PDCCH candidate is a PDCCH candidate where the DCI format 1_0 is transmitted and having a latest end symbol or an earliest start symbol in time domain.

In some embodiments of the present application, the transmitter further transmits configuration information configuring a same lowest-numbered PRB for all of the two or more CORESETs, and the lowest-numbered PRB is the same lowest-numbered PRB.

According to some embodiments of the present application, a method performed by a UE may include: receiving a DCI format 1_0 in two or more linked CSSs associated with two or more CORESETs, wherein each CSS of the two or more linked CSSs is associated with a CORESET of the two or more CORESETs; and determining a lowest-numbered PRB in the two or more CORESETs for mapping from VRB to PRB of a PDSCH transmission scheduled by the DCI format 1_0.

In some embodiments of the present application, the lowest-numbered PRB is a lowest-numbered PRB in one CORESET of the two or more CORESETs determined based on a pre-defined rule.

In some embodiments of the present application, the one CORESET is a CORESET with a lowest CORESET ID or a highest CORESET ID among the two or more CORESETs.

In some embodiments of the present application, the one CORESET is a CORESET associated with a CSS with a lowest CSS ID or a highest CSS ID among the two or more linked CSSs.

In some embodiments of the present application, the one CORESET is a CORESET associated with a lowest lowest-numbered PRB or a highest lowest-numbered PRB in the two or more CORESETs.

In some embodiments of the present application, the method may further include: receiving configuration information configuring a CSS set containing the two or more linked CSSs, wherein the one CORESET is a CORESET associated with a first CSS or a last CSS in the CSS set.

In some embodiments of the present application, the method may further include: receiving configuration information of one CSS of the two or more linked CSSs which contains the CSS ID(s) of the other CSS(s) of the two or more linked CSSs, wherein the one CORESET is a CORESET associated with the one CSS.

In some embodiments of the present application, the one CORESET is a CORESET associated with a reference PDCCH candidate, wherein the reference PDCCH candidate is a PDCCH candidate where the DCI format 1_0 is received and having a latest end symbol or an earliest start symbol in time domain.

In some embodiments of the present application, the method may further include: receiving configuration information configuring a same lowest-numbered PRB for all of the two or more CORESETs, wherein the lowest-numbered PRB is the same lowest-numbered PRB.

According to some other embodiments of the present application, a method performed by a BS may include: transmitting a DCI format 1_0 in two or more linked CSSs associated with two or more CORESETs for scheduling a PDSCH transmission, wherein each CSS of the two or more linked CSSs is associated with a CORESET of the two or more CORESETs; and determining a lowest-numbered PRB in the two or more CORESETs for mapping from VRB to PRB of the PDSCH transmission scheduled by the DCI format 1_0.

In some embodiments of the present application, the lowest-numbered PRB is a lowest-numbered PRB in one CORESET of the two or more CORESETs determined based on a pre-defined rule.

In some embodiments of the present application, the one CORESET is a CORESET with a lowest CORESET ID or a highest CORESET ID among the two or more CORESETs.

In some embodiments of the present application, the one CORESET is a CORESET associated with a CSS with a lowest CSS ID or a highest CSS ID among the two or more linked CSSs.

In some embodiments of the present application, the one CORESET is a CORESET associated with a lowest lowest-numbered PRB or a highest lowest-numbered PRB in the two or more CORESETs.

In some embodiments of the present application, the method may further include: transmitting configuration information configuring a CSS set containing the two or more linked CSSs, wherein the one CORESET is a CORESET associated with a first CSS or a last CSS in the CSS set.

In some embodiments of the present application, the method may further include: transmitting configuration information of one CSS of the two or more linked CSSs which contains the CSS ID(s) of the other CSS(s) of the two or more linked CSSs, wherein the one CORESET is a CORESET associated with the one CSS.

In some embodiments of the present application, the one CORESET is a CORESET associated with a reference PDCCH candidate, wherein the reference PDCCH candidate is a PDCCH candidate where the DCI format 1_0 is transmitted and having a latest end symbol or an earliest start symbol in time domain.

In some embodiments of the present application, the method may further include: transmitting configuration information configuring a same lowest-numbered PRB for all of the two or more CORESETs, wherein the lowest-numbered PRB is the same lowest-numbered PRB.

Embodiments of the present application provide technical solutions for mapping from VRB to PRB of a PDSCH transmission, which include but are not limited to several methods to determine a lowest-numbered PRB in two or more CORESETs for mapping from VRB to PRB of the PDSCH transmission.

BRIEF DESCRIPTION OF THE DRAWINGS

In order to describe the manner in which advantages and features of the application can be obtained, a description of the application is rendered by reference to specific embodiments thereof, which are illustrated in the appended drawings.

These drawings depict only example embodiments of the application and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G (NR), 3GPP long-term evolution (LTE) Release 8, and so on. It is contemplated that along with the developments of network architectures and new service scenarios, all embodiments in the present application are also applicable to similar technical problems; and moreover, the terminologies recited in the present application may change, which should not affect the principle of the present application.

A wireless communication system generally includes one or more BSs and one or more UEs. Furthermore, a BS may be configured with one TRP (or panel) or more TRPs (or panels). A TRP can act like a small BS. The TRPs can communicate with each other by a backhaul link. Such backhaul link may be an ideal backhaul link or a non-ideal backhaul link. Latency of the ideal backhaul link may be deemed as zero, and latency of the non-ideal backhaul link may be tens of milliseconds and much larger, e.g. on the order of tens of milliseconds, than that of the ideal backhaul link.

In a wireless communication system, one single TRP can be used to serve one or more UEs under control of a BS. In different scenarios, TRP may be called in different terms. Persons skilled in the art should understand that as the 3GPP and the communication technology develop, the terminologies recited in the specification may change, which should not affect the scope of the present application. It should be understood that the TRP(s) (or panel(s)) configured for the BS may be transparent to a UE.

Figure 1:
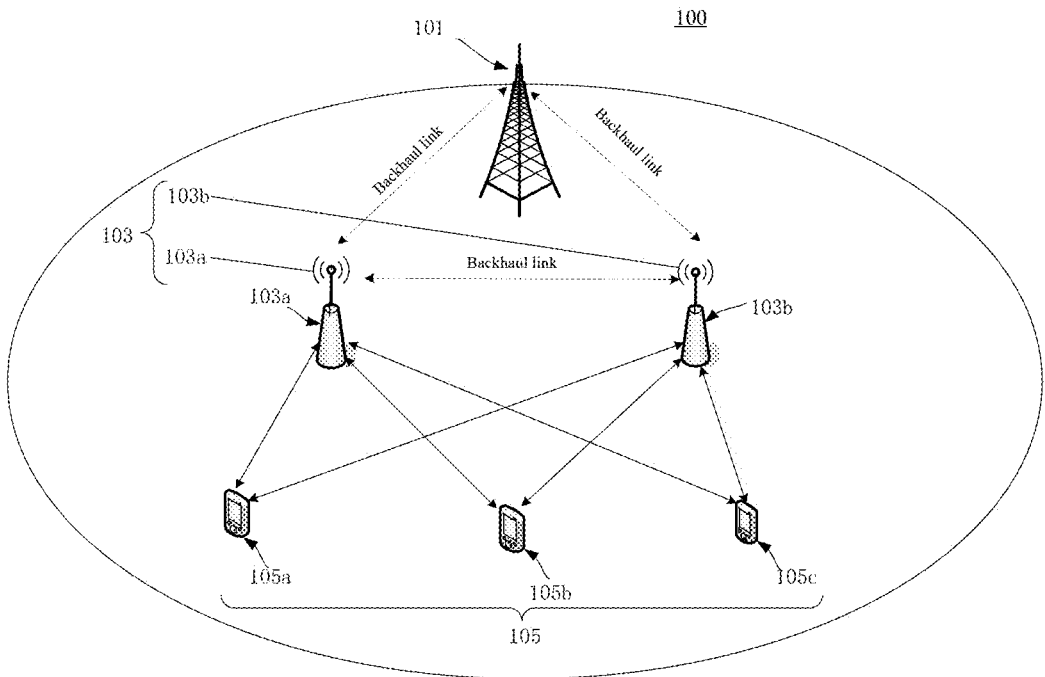
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

Referring to FIG. 1, the wireless communication system 100 can include a BS 101, TRPs 103 (e.g., TRP 103a and TRP 103b), and UEs 105 (e.g., UE 105a, UE 105b, and UE 105c). Although only one BS 101, two TRPs 103 and three UEs 105 are shown for simplicity, it should be noted that the wireless communication system 100 may include more or less communication device(s), apparatus, or node(s) in accordance with some other embodiments of the present application.

In some embodiments of the present application, the BS 101 may be referred to as an access point, an access terminal, a base, a base unit, a macro cell, a Node-B, an evolved Node B (eNB), a gNB, an ng-eNB, a Home Node-B, a relay node, or a device, or described using other terminology used in the art. The UEs 105 (for example, the UE 105a, the UE 105b, and the UE 105c) may include, for example, but is not limited to, a computing device, a wearable device, a mobile device, an internet of things (IoT) device, a vehicle, etc.

The TRPs 103, for example, the TRP 103a and the TRP 103b, can communicate with the BS 101 via, for example, a backhaul link. Each of TRPs 103 can serve some or all of the UEs 105. As shown in FIG. 1, the TRP 103a can serve some mobile stations (which include the UE 105a, the UE 105b, and the UE 105c) within a serving area or region (e.g., a cell or a cell sector). The TRP 103b can serve some mobile stations (which include the UE 105a, the UE 105b, and the UE 105c) within a serving area or region (e.g., a cell or a cell sector). In some other embodiments, the TRP 103a and the TRP 103b can serve different UEs. The TRP 103a and the TRP 103b can communicate with each other via, for example, a backhaul link.

In Rel-16, DCI for scheduling a PDSCH transmission to a UE may be transmitted in a CSS associated with a CORESET. For mapping from VRB to PRB (which is also referred to as VRB-to-PRB mapping) of the PDSCH transmission, the UE may assume that VRBs are mapped to PRBs according to a configured mapping scheme. The mapping scheme may be non-interleaved VRB-to-PRB mapping (i.e., the field vrb-ToPRB-Interleaver is absent in PDSCH-Config IE as specified in the 3GPP standard documents) or interleaved VRB-to-PRB mapping (i.e., the field vrb-ToPRB-Interleaver equals 2 or 4 PRBs in PDSCH-Config IE as specified in the 3GPP standard documents). If no mapping scheme is configured, the UE may assume that the non-interleaved VRB-to-PRB mapping is used.

For the non-interleaved VRB-to-PRB mapping, a VRB n may be mapped to a PRB n, except for PDSCH transmissions scheduled with a DCI format 1_0 in a CSS. In the case that a PDSCH transmission is scheduled with a DCI format 1_0 in a CSS associated with a CORESET, a VRB n may be mapped to a $$PRB \ n + N_{start}^{CORESET},$$

wherein n is an integer index, and $$N_{start}^{CORESET}$$

is the lowest-numbered PRB in the CORESET where the DCI format 1_0 was received.

For the interleaved VRB-to-PRB mapping, the total number of VRBs and PRBs may be divided into $N_{bundle}$ VRB bundles and $N_{bundle}$ PRB bundles, respectively, where $N_{bundle}$ is an integer no less than one, and each VRB bundle may be mapped to a corresponding PRB bundle in an interleaved manner. In the case that a PDSCH transmission is scheduled with a DCI format 1_0 in a CSS associated with a CORESET, $N_{bundle}$, the numbers of VRBs (or PRBs) in the first VRB (or PRB) bundle and the last VRB (or PRB) bundle, the start PRB of the first PRB bundle, etc., may also be determined based on $$N_{start}^{CORESET}.$$

Consequently, in Rel-16, for a PDSCH transmission scheduled by a DCI format 1_0 in a CSS associated with a CORESET, mapping from VRB to PRB of the PDSCH transmission may be determined based on $$N_{start}^{CORESET},$$

regardless of non-interleaved VRB-to-PRB mapping or interleaved VRB-to-PRB mapping.

In Rel-17, DCI for scheduling a PDSCH transmission may be transmitted in two or more linked CSSs (which is also referred to as e-PDCCH mode), wherein each CSS is associated with a corresponding CORESET. For example, the DCI may be transmitted by two or more TRPs or two or more beams of one TRP as shown in FIG. 1, and each TRP or each beam may be associated with a corresponding CORESET. The lowest-numbered PRBs in the two or more CORESETs associated with the two or more linked CSSs may be different. In such cases, for a PDSCH transmission scheduled by a DCI format 1_0 in two or more linked CSSs, how to map from VRB to PRB of the PDSCH transmission needs to be specified because there may be two or more different $$N_{start}^{CORESET}$$

values corresponding to two or more CORESETs where the DCI format 1_0 is received.

Given the above, embodiments of the present application provide improved solutions for mapping from VRB to PRB of a PDSCH transmission. Accordingly, embodiments of the present application provide, for example, several methods to determine a start PRB (i.e., the lowest-numbered PRB) in two or more CORESETs for mapping from VRB to PRB of a PDSCH transmission scheduled by a DCI format 1_0 in an e-PDCCH mode. More details on embodiments of the present application will be described in the following text in combination with the appended drawings.

Figures 2, 3, 4:
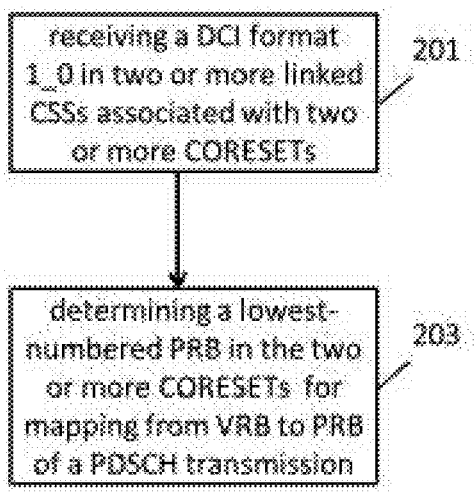
FIG. 2 illustrates a flow chart of an exemplary method for mapping from VRB to PRB according to some embodiments of the present application.
FIG. 3 illustrates exemplary configuration information according to some embodiments of the present application.
FIG. 4 illustrates exemplary configuration information according to some other embodiments of the present application.

FIG. 2 illustrates a flow chart of an exemplary method for mapping from VRB to PRB according to some embodiments of the present application. The method illustrated in FIG. 2 may be performed by a UE (e.g., the UE 105a, the UE 105b, or the UE 105c as shown in FIG. 1). Persons skilled in the art can understand that the method described with respect to the UE can be implemented by other apparatus with the like functions.

As shown in FIG. 2, in step 201, the UE may receive, for example, from a BS (e.g., the BS 101 in FIG. 1), a DCI format 1_0 in two or more linked CSSs associated with two or more CORESETs for scheduling a PDSCH transmission. Each CSS of the two or more linked CSSs is associated with (in other words, included in) a CORESET of the two or more CORESETs. Each CSS may have a unique CSS ID (i.e., SearchSpaceId as specified in the 3GPP standard documents). That is, different CSSs may have different CSS IDs. Each CORESET may have a unique CORESET ID (i.e., ControlResourceSetID as specified in the 3GPP standard documents). That is, different CORESETs may have different CORESET IDs.

In an embodiment of the present application, each CSS of the two or more linked CSSs may include the same information of the DCI format 1_0. For example, each CSS may include one or more repetitions of the DCI format 1_0. In another embodiment of the present application, each CSS of the two or more linked CSSs may include different information of the DCI format 1_0. For example, each CSS may include a different portion of information of the DCI format 1_0.

After receiving the DCI format 1_0, in step 203, the UE may determine a lowest-numbered PRB (i.e., $$N_{start}^{CORESET})$$

in the two or more CORESETs for mapping from VRB to PRB of the PDSCH transmission scheduled by the DCI format 1_0.

In the case that the non-interleaved VRB-to-PRB mapping is configured to the UE or no mapping scheme is configured, the determined lowest-numbered PRB in the two or more CORESETs may be used for mapping each VRB to a corresponding PRB of the PDSCH transmission. For example, a VRB n may be mapped to a $$PRB \ n + N_{start}^{CORESET}.$$

In the case that the interleaved VRB-to-PRB mapping is configured to the UE, the total number of VRBs and PRBs may be divided into $N_{bundle}$ VRB bundles and $N_{bundle}$ PRB bundles, respectively, and the determined lowest-numbered PRB in the two or more CORESETs may be used for mapping each VRB bundle to a corresponding PRB bundle. For example, the determined lowest-numbered PRB in the two or more CORESETs may be used for determining $N_{bundle}$, the number of VRBs (or PRBs) in the first VRB (or PRB) bundle, the number of VRBs (or PRBs) in the last VRB (or PRB) bundle, and the start PRB of the first PRB bundle, etc.

For example, it is assumed that mapping from VRB to PRB of a PDSCH transmission #0 is interleaved VRB-to-PRB mapping. The PDSCH transmission #0 is scheduled with a DCI format 1_0 in a CSS in bandwidth part (BWP) i, where i=0, 1, 2, . . . 4 A set of $$N_{BWP,init}^{size} \ PRBs \ \{N_{start}^{CORESET}, N_{start}^{CORESET} + 1, \ldots, N_{start}^{CORESET} + N_{BWP,init}^{size} - 1\}$$

are divided into $N_{bundle}$ PRB bundles and a set of $$N_{BWP,init}^{size} \ VRBs \ \{0, 1, \ldots, N_{BWP,init}^{size} - 1\}$$

are also divided into $N_{bundle}$ VRB bundles, wherein $$N_{BWP,init}^{size}$$

is the number of resource blocks (RBs) in the initial BWP (i.e., BWP 0), and $$N_{bundle} = \lceil (N_{BWP,init}^{size} + (N_{BWP,i}^{start} + N_{start}^{CORESET}) \bmod L) / L \rceil,$$

wherein L is the bundle size (for example, L=2) which may be configured by the BS, and $$N_{BWP,i}^{start}$$

is the start position (i.e., the start RB) of BWP i. Each bundle contains one or more consecutive RBs. The first VRB (or PRB) bundle consists of $$L - \left( (N_{BWP,i}^{start} + N_{start}^{CORSET}) \bmod L \right)$$

VRBs (or PRBs), the last VRB (or PRB) bundle consists of $$\left( N_{BWP,init}^{size} + N_{BWP,i}^{start} + N_{start}^{CORESET} \right)$$

mod L VRBs (or PRBs) if $$\left( N_{BWP,init}^{size} + N_{BWP,i}^{start} + N_{start}^{CORESET} \right) \bmod L > 0$$

and consists of L VRBs (or PRBs) otherwise, and other VRB (or PRB) bundle(s) consists of L VRBs (or PRBs). In this example, $$N_{start}^{CORSET}$$

is the determined lowest-numbered PRB in the two or more CORESETs.

According to some embodiments of the present application, the lowest-numbered PRB in the two or more CORESETs may be a lowest-numbered PRB in one CORESET of the two or more CORESETs determined based on a pre-defined rule. That is, the UE may determine, based on a pre-defined rule, a lowest-numbered PRB in one CORESET of the two or more CORESETs to be the lowest-numbered PRB in the two or more CORESETs to be used for mapping from VRB to PRB of the PDSCH transmission.

In an embodiment of the present application, the pre-defined rule may be that the lowest-numbered PRB in the two or more CORESETs for mapping from VRB to PRB of the PDSCH transmission is a lowest-numbered PRB in the CORESET with a lowest CORESET ID or a highest CORE-SET ID among the two or more CORESETs.

For example, it is assumed that:
CORESET #0 contains a CSS #0 (i.e., CSS #0 is associated with CORESET #0) and the lowest-numbered PRB of CORESET #0 is PRB #0; CORESET #1 contains a CSS #1 (i.e., CSS #1 is associated with CORESET #1) and the lowest-numbered PRB of CORESET #1 is PRB #1;
CORESET #0 has a lower CORESET ID than CORESET #1; CSS #0 has a higher CSS ID than CSS #1;
CSS #0 is configured to be linked with CSS #1; a DCI format 0_1 scheduling a PDSCH transmission #0 is transmitted in CSS #0 and CSS #1, for example, one or more repetitions of the DCI format 0_1 is transmitted in CSS #0, and the other one or more repetitions of the DCI format 0_1 is transmitted in CSS #1;

The mapping scheme is non-interleaved VRB-to-PRB mapping; and
The pre-defined rule is that: the lowest-numbered PRB for mapping from VRB to PRB is a lowest-numbered PRB in the CORESET with a lowest CORESET ID.
After receiving the DCI format 0_1 in CSS #0 and CSS #1, the UE may determine PRB #0 in CORESET #0 to be the lowest-numbered PRB for mapping from VRB to PRB of PDSCH transmission #0 because CORESET #0 has a lower CORESET ID than CORESET #1. Then, the UE may determine that VRB n is mapped to PRB n+PRB #0.

In another embodiment of the present application, the pre-defined rule may be that the lowest-numbered PRB in the two or more CORESETs for mapping from VRB to PRB of the PDSCH transmission is a lowest-numbered PRB in the CORESET which is associated with a CSS with a lowest CSS ID or a highest CSS ID among the two or more linked CSSs.

For example, it is assumed that:
CORESET #0 contains a CSS #0 (i.e., CSS #0 is associated with CORESET #0) and the lowest-numbered PRB of CORESET #0 is PRB #0; CORESET #1 contains a CSS #1 (i.e., CSS #1 is associated with CORESET #1) and the lowest-numbered PRB of CORESET #1 is PRB #1;
CORESET #0 has a lower CORESET ID than CORESET #1; CSS #0 has a higher CSS ID than CSS #1;
CSS #0 is configured to be linked with CSS #1; a DCI format 0_1 scheduling a PDSCH transmission #0 is transmitted in CSS #0 and CSS #1, for example, one or more repetitions of the DCI format 0_1 is transmitted in CSS #0, and the other one or more repetitions of the DCI format 0_1 is transmitted in CSS #1;
The mapping scheme is non-interleaved VRB-to-PRB mapping; and
The pre-defined rule is that: the lowest-numbered PRB for mapping from VRB to PRB is a lowest-numbered PRB in the CORESET associated with a CSS with a lowest CSS ID.
After receiving the DCI format 0_1 in CSS #0 and CSS #1, the UE may determine PRB #1 in CORESET #1 to be the lowest-numbered PRB for mapping from VRB to PRB of PDSCH transmission #0 because CORESET #1 is associated with CSS #1 with a lower CSS ID than CSS #0. Then, the UE may determine that VRB n is mapped to PRB n+PRB #1.

In yet another embodiment of the present application, the pre-defined rule may be that the lowest-numbered PRB in the two or more CORESETs for mapping from VRB to PRB of the PDSCH transmission is a lowest-numbered PRB in the CORESET which is associated with a lowest lowest-numbered PRB or a highest lowest-numbered PRB in the two or more CORESETs. In the case that such rule is applied while the two or more CORESETs have the same lowest-numbered PRB, the lowest-numbered PRB in the two or more CORESETs for mapping from VRB to PRB of the PDSCH transmission may be determined based on any other rules, for example, the lowest-numbered PRB can be the lowest-numbered PRB in the CORESET with a lowest CORESET ID or a highest CORESET ID among the two or more CORESETs, or the lowest-numbered PRB can be the lowest-numbered PRB in the CORESET associated with a lowest CSS ID or a highest CSS ID among the two or more linked CSSs.

For example, it is assumed that a DCI format 1_0 scheduling a PDSCH transmission is transmitted in three linked CSSs (i.e., CSS #0, CSS #1, and CSS #2). CSS #0 is associated with CORESET #0, CSS #1 is associated with CORESET #1, CSS #2 is associated with CORESET #2. The lowest-numbered PRB of CORESET #0 is PRB #10, the lowest-numbered PRB of CORESET #1 is PRB #0, and the lowest-numbered PRB of CORESET #2 is PRB #20. Therefore, PRB #0 is the lowest lowest-numbered PRB and PRB #20 is the highest lowest-numbered PRB among the three lowest-numbered PRBs. In the case that the pre-defined rule is that the lowest-numbered PRB for mapping from VRB to PRB is a lowest-numbered PRB in the CORESET which is associated with a lowest lowest-numbered PRB, the UE may determine the lowest-numbered PRB of CORESET #1 (i.e., PRB #0) to be the lowest-numbered PRB for mapping from VRB to PRB of the PDSCH transmission.

In yet another embodiment of the present application, before receiving the DCI format 1_0 in the two or more linked CSSs, the UE may receive configuration information configuring a CSS set containing the two or more linked CSSs. In such embodiment, the pre-defined rule may be that the lowest-numbered PRB in the two or more CORESETs for mapping from VRB to PRB of the PDSCH transmission is a lowest-numbered PRB in the CORESET which is associated with a first CSS or a last CSS in the configured CSS set. In some embodiments, the configuration information configuring a CSS set may be received via a radio resource control (RRC) signaling.

FIG. 3 illustrates exemplary configuration information for configuring a CSS set according to some embodiments of the present application.

In the example of FIG. 3, searchspaceset is the configuration information configuring the CSS set and maxNrofSearchSpacePerSet is the maximum number of CSSs that can be configured in the CSS set. The searchspaceset may include a sequence of CSS IDs (i.e., SearchSpaceId) of the CSSs configured in the CSS set.

For example, it is assumed that:
The UE receives configuration information as shown in FIG. 3 configuring a CSS set including a sequence of CSS IDs (CSS #2, CSS #4, CSS #1), i.e., the first CSS in the CSS set is CSS #2 and the last CSS in the CSS set is CSS #1;
CSS #1 is associated with CORESET #0 and the lowest-numbered PRB of CORESET #0 is PRB #0; CSS #2 is associated with CORESET #1 and the lowest-numbered PRB of CORESET #1 is PRB #1; CSS #4 is associated with CORESET #2 and the lowest-numbered PRB of CORESET #2 is PRB #2;
A DCI format 0_1 scheduling a PDSCH transmission #0 is transmitted in CSS #1, CSS #2, and CSS #4;
The mapping scheme is non-interleaved VRB-to-PRB mapping; and
The pre-defined rule is that: the lowest-numbered PRB for mapping from VRB to PRB is a lowest-numbered PRB in the CORESET associated with a first CSS in the CSS set.

After receiving the DCI format 0_1 in CSS #1, CSS #2, and CSS #4, the UE may determine PRB #1 in CORESET #1 to be the lowest-numbered PRB for mapping from VRB to PRB of PDSCH transmission #0 because CORESET #1 is associated with the first CSS in the CSS set, i.e., CSS #2. Then, the UE may determine that VRB n is mapped to PRB n+PRB #1.

In yet another embodiment of the present application, before receiving the DCI format 1_0 in the two or more linked CSSs, the UE may receive configuration information of one CSS of the two or more linked CSSs, and the configuration information of the one CSS may contain the CSS ID(s) of the other CSS(s) of the two or more linked CSSs. In such embodiment, the one CSS may be referred to as an anchor CSS, and the pre-defined rule may be that the lowest-numbered PRB in the two or more CORESETs for mapping from VRB to PRB of the PDSCH transmission is a lowest-numbered PRB in the CORESET associated with the anchor CSS. In some embodiments, the configuration information of the anchor CSS may be received via an RRC signaling.

FIG. 4 illustrates exemplary configuration information for configuring an anchor CSS according to some embodiments of the present application.

In the example of FIG. 4, SearchSpace is the configuration information of the anchor CSS. The SearchSpace may include a CSS ID (i.e., searchSpaceId) of the anchor CSS, the CORESET ID (i.e., controlResourceSetId) of the CORESET associated with the anchor CSS, the search space type (i.e., searchSpaceType) of the anchor CSS, and a sequence (i.e., associatedSearchSpaceSetID) of ID(s) of CSS(s) (i.e., SearchSpaceSetId) linked with the anchor CSS. In FIG. 4, maxNrofassociatedSearchSpaceSets is the maximum number of CSSs that can be configured to be linked with the anchor CSS.

For example, it is assumed that:
The UE receives configuration information of CSS #0 as shown in FIG. 4 which includes an associated CSS ID of CSS #1, that is, CSS #0 is an anchor CSS with which CSS #1 is linked;
CSS #0 is associated with CORESET #0 and the lowest-numbered PRB of CORESET #0 is PRB #0; CSS #1 is associated with CORESET #1 and the lowest-numbered PRB of CORESET #1 is PRB #1.
A DCI format 0_1 scheduling a PDSCH transmission #0 is transmitted in CSS #0 and CSS #1; and
The mapping scheme is interleaved VRB-to-PRB mapping.

After receiving the DCI format 0_1 in CSS #0 and CSS #1, the UE may determine PRB #0 in CORESET #0 to be the lowest-numbered PRB for mapping from VRB to PRB of PDSCH transmission #0 because CORESET #0 is associated with the anchor CSS, i.e., CSS #0. Then, the UE may determine mapping from VRB to PRB of PDSCH transmission #0 based on the determined lowest-numbered PRB (i.e., PRB #0).

For example, the set of $$N_{BWP,init}^{size} \ PRBs$$

$$\{N_{start}^{CORESET\#0}, N_{start}^{CORESET\#0} + 1, \ldots , N_{start}^{CORESET\#0} + N_{BWP,init}^{size} - 1\}$$

are divided into $N_{bundle}$ PRB bundles and $$N_{BWP,init}^{size}$$

VRBs are also divided into $N_{bundle}$ VRB bundles, wherein $$N_{BWP,init}^{size}$$

is the number of RBs in the initial BWP, and $$N_{bundle} = \lceil (N_{BWP,init}^{size} + (N_{BWP,i}^{start} + N_{start}^{CORESET\#0}) \bmod L) / L \rceil,$$

wherein L is the bundle size (for example, L=2) which may be configured by the BS, and $$N_{BWP,i}^{start}$$

is the start RB of the initial BWP. The first VRB (or PRB) bundle consists of $$L - \left( \left( N_{BWP,i}^{start} + N_{start}^{CORESET\#0} \right) \bmod L \right)$$

VRBs (or PRBs), the last VRB (or PRB) bundle consists of $$\left( N_{BWP,init}^{size} + N_{BWP,i}^{start} + N_{start}^{CORESET\#0} \right)$$

mod L VRBs (or PRBs) if $$\left( N_{BWP,init}^{size} + N_{BWP,i}^{start} + N_{start}^{CORESET\#0} \right) \bmod L > 0$$

and consists of L VRBs (or PRBs) otherwise, and other VRB (or PRB) bundles consists of L VRBs (or PRBs). In this example, $$N_{start}^{CORESET\#0}$$

is the lowest-numbered PRB in CORESET #0, i.e., PRB #0. Each VRB bundle is mapped to one PRB bundle in an interleaved manner.

In yet another embodiment of the present application, the pre-defined rule may be that the lowest-numbered PRB in the two or more CORESETs for mapping from VRB to PRB of the PDSCH transmission is a lowest-numbered PRB in the CORESET associated with a reference PDCCH candidate. The reference PDCCH candidate is a PDCCH candidate where the DCI format 1_0 is received and having a latest end symbol or an earliest start symbol in time domain. In such embodiment, each CSS of the two or more linked CSSs may include a PDCCH candidate for transmitting the DCI format 1_0. Accordingly, the two or more CORESETs associated with the two or more linked CSSs may include two or more PDCCH candidates for transmitting the DCI format 1_0, where each CORESET may include a PDCCH candidate for transmitting the DCI format 1_0 (i.e., each CORESET is associated with a PDCCH candidate for transmitting the DCI format 10). The reference PDCCH candidate is a PDCCH candidate in the two or more PDCCH candidates where the DCI format 1_0 is received and which has a latest end symbol or an earliest start symbol in time domain.

In the case that such rule is applied while the two or more PDCCH candidates in the two or more CORESETs where the DCI format 1_0 is received have the same end symbol or the same start symbol in time domain, the lowest-numbered PRB in the two or more CORESETs for mapping from VRB to PRB of the PDSCH transmission may be determined based on any other rules, for example, the lowest-numbered PRB can be the lowest-numbered PRB in the CORESET with a lowest CORESET ID or a highest CORESET ID among the two or more CORESETs, or the lowest-numbered PRB can be the lowest-numbered PRB in the CORESET associated with a lowest CSS ID or a highest CSS ID among the two or more linked CSSs.

According to some other embodiments of the present application, the BS may always configure the two or more CORESETs associated with the two or more linked CSSs to have a same lowest-numbered PRB. For example, before receiving the DCI format 1_0 in the two or more linked CSSs, the UE may receive configuration information from the BS, and the configuration information may configure a same lowest-numbered PRB for all of the two or more CORESETs. In such embodiments, the UE does not expect different lowest-numbered PRBs in the two or more CORESETs when receiving a DCI format 1_0 in the two or more linked CSSs associated with the two or more CORESETs.

In an embodiment of the present application, the two or more CORESETs may be configured in the following way to have a same lowest-numbered PRB. The configuration for each CORESET may include a FrequencyDomainResources field which is used to configure frequency domain resources for the CORESET. The FrequencyDomainResources field may include a sequence of bits which have bit indexes in an increasing order from left to right and correspond to groups of PRBs (for example, a group of PRBs may include 6 PRBs) in the BWP in an increasing order from the first group of PRBs to the last group of PRBs in the BWP, wherein each bit corresponds to a group of PRBs. A bit being "1" indicates that a corresponding group of PRBs belongs to the frequency domain resources of the CORESET. In such embodiment, to configure the two or more CORESETs with a same lowest-numbered PRB, the first (i.e., left-most) bits being "1" in the FrequencyDomainResources fields of the two or more CORESETs are with a same bit index.

For example, it is assumed that a BWP includes 45 groups of PRBs, and each group includes 6 PRBs. The FrequencyDomainResources field in the configuration for each CORESET of the two or more CORESETs may include 45 bits, and these 45 bits may have indexes starting from "0" to "44" in the order from left to right. Bit 0 may be used to indicate whether the first group of PRBs of the 45 groups of PRBs belongs to the frequency domain resources of the CORESET, bit 1 may be used to indicate whether the second group of PRBs of the 45 groups of PRBs belongs to the frequency domain resources of the CORESET, . . . , and bit 44 may be used to indicate whether the last group of PRBs of the 45 groups of PRBs belongs to the frequency domain resources of the CORESET. In the case that the left-most bit being "1" in the FrequencyDomainResources field of each CORESET of the two or more CORESETs is the fourth bit (i.e., bit index is "3"), it means that all the two or more CORESETs have a same lowest-numbered PRB, i.e., the nineteenth (e.g., PRB #18) PRB in the BWP (e.g., the first groups of PRBs contains PRB #0 to PRB #5, the second group of PRBs contains PRB #6 to PRB #11, the third group of PRBs contains PRB #12 to PRB #17, and the fourth group of PRBs contains PRB #18 to PRB #23).

Consequently, after receiving such configuration information from the BS, the UE may determine that the lowest-numbered PRB of the two or more CORESETs is the same one. Then, after receiving the DCI format 1_0 in the two or more linked CSSs associated with the two or more CORESETs, the UE can determine a unique lowest-numbered PRB (i.e., the same lowest-numbered PRB) in the two or more CORESETs for mapping from VRB to PRB of the PDSCH transmission.

Figures 5, 6:
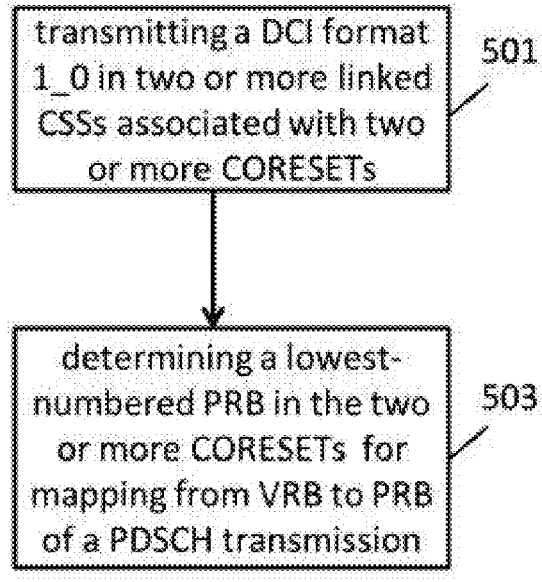
FIG. 5 illustrates a flow chart of another exemplary method for mapping from VRB to PRB according to some other embodiments of the present application.
FIG. 6 illustrates a simplified block diagram of an exemplary apparatus for mapping from VRB to PRB according to some embodiments of the present application.

FIG. 5 illustrates a flow chart of another exemplary method for mapping from VRB to PRB according to some other embodiments of the present application. The method illustrated in FIG. 5 may be performed by a BS (e.g., the BS 101 as shown in FIG. 1). Persons skilled in the art can understand that the method described with respect to the BS can be implemented by other apparatus with the like functions.

As shown in FIG. 5, in step 501, the BS may transmit a DCI format 1_0 in two or more linked CSSs associated with two or more CORESETs, for example, to a UE (e.g., the UE 105a, the UE 105b, or the UE 105c as shown in FIG. 1) for scheduling a PDSCH transmission. Each CSS of the two or more linked CSSs is associated with (in other words, included in) a CORESET of the two or more CORESETs. Each CSS may have a unique CSS ID (i.e., SearchSpaceId as specified in the 3GPP standard documents). That is, different CSSs may have different CSS IDs. Each CORESET may have a unique CORESET ID (i.e., ControlResourceSetID as specified in the 3GPP standard documents). That is, different CORESETs may have different CORESET IDs.

In an embodiment of the present application, each CSS of the two or more linked CSSs may include the same information of the DCI format 1_0. For example, each CSS may include one or more repetitions of the DCI format 1_0. In another embodiment of the present application, each CSS of the two or more linked CSSs may include different information of the DCI format 1_0. For example, each CSS may include a different portion of information of the DCI format 1_0.

In step 503, the BS may determine a lowest-numbered PRB (i.e., $$N_{start}^{CORESET})$$

in the two or more CORESETs for mapping from VRB to PRB of the PDSCH transmission scheduled by the DCI format 1_0. Step 503 may occur after or simultaneously with step 501.

The BS may use the same methods as those used by the UE as described above to determine the lowest-numbered PRB for mapping from VRB to PRB of the PDSCH transmission.

For example, according to some embodiments of the present application, the lowest-numbered PRB may be a lowest-numbered PRB in one CORESET of the two or more CORESETs determined based on a pre-defined rule.

In an embodiment of the present application, the one CORESET is a CORESET with a lowest CORESET ID or a highest CORESET ID among the two or more CORESETs.

In another embodiment of the present application, the one CORESET is a CORESET associated with a CSS with a lowest CSS ID or a highest CSS ID among the two or more linked CSSs.

In yet another embodiment of the present application, the one CORESET is a CORESET associated with a lowest lowest-numbered PRB or a highest lowest-numbered PRB in the two or more CORESETs. In the case that such rule is applied while the two or more CORESETs have the same lowest-numbered PRB, the lowest-numbered PRB in the two or more CORESETs for mapping from VRB to PRB of the PDSCH transmission may be determined based on any other rules, for example, the lowest-numbered PRB can be the lowest-numbered PRB in the CORESET with a lowest CORESET ID or a highest CORESET ID among the two or more CORESETs, or the lowest-numbered PRB can be the lowest-numbered PRB in the CORESET associated with a lowest CSS ID or a highest CSS ID among the two or more linked CSSs.

In yet another embodiment of the present application, before transmitting the DCI format 1_0 in the two or more linked CSSs to the UE, the BS may transmit configuration information configuring a CSS set containing the two or more linked CSSs. In such embodiment, the one CORESET is a CORESET associated with a first CSS or a last CSS in the CSS set. In some embodiments, the configuration information configuring a CSS set may be transmitted via an RRC signaling. The configuration information configuring a CSS set may be that shown in FIG. 3.

In yet another embodiment of the present application, before transmitting the DCI format 1_0 in the two or more linked CSSs to the UE, the BS may transmit configuration information of one CSS of the two or more linked CSSs to the UE, and the configuration information of the one CSS may contain the CSS ID(s) of the other CSS(s) of the two or more linked CSSs. In such embodiment, the one CSS may be referred to as an anchor CSS, and the one CORESET is a CORESET associated with the anchor CSS. In some embodiments, the configuration information of the anchor CSS may be transmitted via an RRC signaling. The configuration information configuring the anchor CSS may be that shown in FIG. 4.

In yet another embodiment of the present application, the one CORESET is a CORESET associated with a reference PDCCH candidate. The reference PDCCH candidate is a PDCCH candidate where the DCI format 1_0 is transmitted and having a latest end symbol or an earliest start symbol in time domain. In the case that such rule is applied while the two or more PDCCH candidates transmitting the DCI format 1_0 in the two or more CORESETs have the same end symbol or the same start symbol in time domain, the lowest-numbered PRB in the two or more CORESETs for mapping from VRB to PRB of the PDSCH transmission may be determined based on any other rules, for example, the lowest-numbered PRB can be the lowest-numbered PRB in the CORESET with a lowest CORESET ID or a highest CORESET ID among the two or more CORESETs, or the lowest-numbered PRB can be the lowest-numbered PRB in the CORESET associated with a lowest CSS ID or a highest CSS ID among the two or more linked CSSs.

According to some other embodiments of the present application, the BS may always configure the two or more CORESETs associated with the two or more linked CSSs to have a same lowest-numbered PRB. For example, before transmitting the DCI format 1_0 in the two or more linked CSSs, the BS may transmit configuration information to the UE, and the configuration information may configure a same lowest-numbered PRB for all of the two or more CORESETs. In such embodiments, the BS may determine a unique lowest-numbered PRB (i.e., the same lowest-numbered PRB) in the two or more CORESETs for mapping from VRB to PRB of the PDSCH transmission.

In an embodiment of the present application, the two or more CORESETs may be configured in the following way to have a same lowest-numbered PRB. The configuration for each CORESET may include a FrequencyDomainResources field which is used to configure frequency domain resources for the CORESET. The FrequencyDomainResources field may include a sequence of bits which have bit indexes in an increasing order from left to right and correspond to groups of PRBs (for example, a group of PRBs may include 6

PRBs) in the BWP in an increasing order from the first group of PRBs to the last group of PRBs in the BWP, wherein each bit corresponds to a group of PRBs. A bit being "1" indicates that a corresponding group of PRBs belongs to the frequency domain resources of the CORESET. In such embodiment, to configure the two or more CORESETs with a same lowest-numbered PRB, the first (i.e., left-most) bits being "1" in the FrequencyDomainResources fields of the two or more CORESETs are with a same bit index.

FIG. 6 illustrates a simplified block diagram of an exemplary apparatus 600 for mapping from VRB to PRB according to some embodiments of the present application. The apparatus 600 may be or include at least part of a UE (e.g., the UE 105a, the UE 105b, or the UE 105c in FIG. 1) or a BS (e.g., the BS 101 in FIG. 1).

Referring to FIG. 6, the apparatus 600 may include at least one transmitter 602, at least one receiver 604, and at least one processor 606. The at least one transmitter 602 is coupled to the at least one processor 606, and the at least one receiver 604 is coupled to the at least one processor 606.

Although in this figure, elements such as the transmitter 602, the receiver 604, and the processor 606 are illustrated in the singular, the plural is contemplated unless a limitation to the singular is explicitly stated. In some embodiments of the present application, the transmitter 602 and the receiver 604 may be combined to one device, such as a transceiver. In some embodiments of the present application, the apparatus 600 may further include an input device, a memory, and/or other components.

According to some embodiments of the present application, the apparatus 600 may be a UE. The receiver 604 of the UE may receive a DCI format 1_0 in two or more linked CSSs associated with two or more CORESETs, wherein each CSS of the two or more linked CSSs is associated with a CORESET of the two or more CORESETs. The processor 606 may determine a lowest-numbered PRB in the two or more CORESETs for mapping from VRB to PRB of a PDSCH transmission scheduled by the DCI format 1_0.

In some embodiments of the present application, the lowest-numbered PRB is a lowest-numbered PRB in one CORESET of the two or more CORESETs determined based on a pre-defined rule.

In an embodiment of the present application, the one CORESET is a CORESET with a lowest CORESET ID or a highest CORESET ID among the two or more CORESETs.

In another embodiment of the present application, the one CORESET is a CORESET associated with a CSS with a lowest CSS ID or a highest CSS ID among the two or more linked CSSs.

In yet another embodiment of the present application, the one CORESET is a CORESET associated with a lowest lowest-numbered PRB or a highest lowest-numbered PRB in the two or more CORESETs.

In yet another embodiment of the present application, the receiver 604 may further receive configuration information configuring a CSS set containing the two or more linked CSSs, and the one CORESET is a CORESET associated with a first CSS or a last CSS in the CSS set.

In yet another embodiment of the present application, the receiver 604 may further receive configuration information of one CSS of the two or more linked CSSs which contains the CSS ID(s) of the other CSS(s) of the two or more linked CSSs, and the one CORESET is a CORESET associated with the one CSSS.

In yet another embodiment of the present application, the one CORESET is a CORESET associated with a reference PDCCH candidate, wherein the reference PDCCH candidate is a PDCCH candidate where the DCI format 1_0 is received and having a latest end symbol or an earliest start symbol in time domain.

In some other embodiments of the present application, the receiver 604 may further receive configuration information configuring a same lowest-numbered PRB for all of the two or more CORESETs, and the lowest-numbered PRB is the same lowest-numbered PRB.

According to some other embodiments of the present application, the apparatus 600 may be a BS. The transmitter 602 of the BS may transmit a DCI format 1_0 in two or more linked CSSs associated with two or more CORESETs for scheduling a PDSCH transmission, wherein each CSS of the two or more linked CSSs is associated with a CORESET of the two or more CORESETs. The processor 606 of the BS may determine a lowest-numbered PRB in the two or more CORESETs for mapping from VRB to PRB of the PDSCH transmission scheduled by DCI format 1_0.

In some embodiments of the present application, the lowest-numbered PRB is a lowest-numbered PRB in one CORESET of the two or more CORESETs determined based on a pre-defined rule.

In an embodiment of the present application, the one CORESET is a CORESET with a lowest CORESET ID or a highest CORESET ID among the two or more CORESETs.

In another embodiment of the present application, the one CORESET is a CORESET associated with a CSS with a lowest CSS ID or a highest CSS ID among the two or more linked CSSs.

In yet another embodiment of the present application, the one CORESET is a CORESET associated with a lowest lowest-numbered PRB or a highest lowest-numbered PRB in the two or more CORESETs.

In yet another embodiment of the present application, the transmitter 602 may further transmit configuration information configuring a CSS set containing the two or more linked CSSs, and the one CORESET is a CORESET associated with a first CSS or a last CSS in the CSS set.

In yet another embodiment of the present application, the transmitter 602 may further transmit configuration information of one CSS of the two or more linked CSSs which contains the CSS ID(s) of the other CSS(s) of the two or more linked CSSs, and the one CORESET is a CORESET associated with the one CSS.

In yet another embodiment of the present application, the one CORESET is a CORESET associated with a reference PDCCH candidate, wherein the reference PDCCH candidate is a PDCCH candidate where the DCI format 1_0 is transmitted and having a latest end symbol or an earliest start symbol in time domain.

In some other embodiments of the present application, the transmitter 602 may further transmit configuration information configuring a same lowest-numbered PRB for all of the two or more CORESETs, and the lowest-numbered PRB is the same lowest-numbered PRB.

In some embodiments of the present application, the apparatus 600 may further include at least one non-transitory computer-readable medium. In some embodiments of the present disclosure, the non-transitory computer-readable medium may have stored thereon computer-executable instructions to cause a processor to implement the method with respect to a UE or a BS as described above. For example, the computer-executable instructions, when executed, cause the processor 606 to interact with the transmitter 602 and/or the receiver 604, so as to perform operations of the methods, e.g., as described in view of any of FIGS. 2 and 5.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for mapping from VRB to PRB, including a processor and a memory. Computer programmable instructions for implementing a method for mapping from VRB to PRB are stored in the memory, and the processor is configured to perform the computer programmable instructions to implement the method for mapping from VRB to PRB. The method for mapping from VRB to PRB may be any method as described in the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for mapping from VRB to PRB according to any embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:

at least one memory; and at least one processor coupled with the at least one memory and configured to cause the UE to:

receive a downlink control information (DCI) format 1_0 in two or more linked common search spaces (CSSs) associated with two or more control resource sets (CORESETs), wherein each CSS of the two or more linked CSSs is associated with a CORESET of the two or more CORESETs; and determine a lowest-numbered physical resource block (PRB) in the two or more CORESETs for mapping from virtual resource block (VRB) to PRB of a physical downlink shared channel (PDSCH) transmission scheduled by the DCI format 1_0.

2. The UE of claim 1, wherein the lowest-numbered PRB is a lowest-numbered PRB in a CORESET with a lowest CORESET identity (ID) among the two or more CORESETs.

3. The UE of claim 1, wherein the lowest-numbered PRB is a lowest-numbered PRB in a CORESET associated with a CSS with a lowest CSS ID or a highest CSS ID among the two or more linked CSSs.

4. The UE of claim 1, wherein the lowest-numbered PRB is a lowest-numbered PRB in a CORESET associated with a lowest lowest-numbered PRB or a highest lowest-numbered PRB in the two or more CORESETs.

5. The UE of claim 1, wherein the at least one processor is further configured to cause the UE to receive configuration information configuring a CSS set containing the two or more linked CSSs, and wherein the lowest-numbered PRB is a lowest-numbered PRB in a CORESET associated with a first CSS or a last CSS in the CSS set.

6. The UE of claim 1, wherein the at least one processor is further configured to cause the UE to receive configuration information of one CSS of the two or more linked CSSs which contains CSS ID(s) of other CSS(s) of the two or more linked CSSs, and wherein the lowest-numbered PRB is a lowest-numbered PRB in the one CORESET is a CORESET associated with the one CSS.

7. The UE of claim 1, wherein the lowest-numbered PRB is a lowest-numbered PRB in is a CORESET associated with a reference physical downlink control channel (PDCCH) candidate, wherein the reference PDCCH candidate is a PDCCH candidate where the DCI format 1_0 is received and having a latest end symbol or an earliest start symbol in time domain.

8. The UE of claim 1, wherein the at least one processor is further configured to cause the UE to receive configuration information configuring a same lowest-numbered PRB for all of the two or more CORESETs, and wherein the lowest-numbered PRB is the same lowest-numbered PRB.

9. A base station (BS) for wireless communication, comprising:

at least one memory; and at least one processor coupled with the at least one memory and configured to cause the BS to:

transmit a downlink control information (DCI) format 1_0 in two or more linked common search spaces (CSSs) associated with two or more control resource sets (CORESETs) for scheduling a physical downlink shared channel (PDSCH) transmission, wherein each CSS of the two or more linked CSSs is associated with a CORESET of the two or more CORESETs; and a determine a lowest-numbered physical resource block (PRB) in the two or more CORESETs for mapping from virtual resource block (VRB) to PRB of the PDSCH transmission scheduled by the DCI format 1_0.

10. A method performed by a user equipment (UE), the method comprising:

receiving a downlink control information (DCI) format 1_0 in two or more linked common search spaces (CSSs) associated with two or more control resource sets (CORESETs), wherein each CSS of the two or more linked CSSs is associated with a CORESET of the two or more CORESETs; and determining a lowest-numbered physical resource block (PRB) in the two or more CORESETs for mapping from virtual resource block (VRB) to PRB of a physical downlink shared channel (PDSCH) transmission scheduled by the DCI format 1_0.

11. The method of claim 10, wherein the lowest-numbered PRB is a lowest-numbered PRB in a CORESET with a lowest CORESET identity (ID) among the two or more CORESETs.

12. The method of claim 10, wherein the lowest-numbered PRB is a lowest-numbered PRB in a CORESET associated with a CSS with a lowest CSS ID or a highest CSS ID among the two or more linked CSSs.

13. The BS of claim 9, wherein the lowest-numbered PRB is a lowest-numbered PRB in a CORESET with a lowest CORESET identity (ID) among the two or more CORESETs.

14. A processor for wireless communication, comprising:

at least one controller coupled with at least one memory and configured to cause the processor to:

receive a downlink control information (DCI) format 1_0 in two or more linked common search spaces (CSSs) associated with two or more control resource sets (CORESETs), wherein each CSS of the two or more linked CSSs is associated with a CORESET of the two or more CORESETs; and determine a lowest-numbered physical resource block (PRB) in the two or more CORESETs for mapping from virtual resource block (VRB) to PRB of a physical downlink shared channel (PDSCH) transmission scheduled by the DCI format 1_0.

15. The processor of claim 14, wherein the lowest-numbered PRB is a lowest-numbered PRB in a CORESET with a lowest CORESET identity (ID) among the two or more CORESETs.

16. The processor of claim 14, wherein the lowest-numbered PRB is a lowest-numbered PRB in a CORESET associated with a CSS with a lowest CSS ID or a highest CSS ID among the two or more linked CSSs.

17. The processor of claim 14, wherein the lowest-numbered PRB is a lowest-numbered PRB in a CORESET associated with a lowest lowest-numbered PRB or a highest lowest-numbered PRB in the two or more CORESETs.

18. The processor of claim 14, wherein the at least one controller is further configured to cause the processor to receive configuration information configuring a CSS set containing the two or more linked CSSs, and wherein the lowest-numbered PRB is a lowest-numbered PRB in a CORESET associated with a first CSS or a last CSS in the CSS set.

19. The processor of claim 14, wherein the at least one controller is further configured to cause the processor to receive configuration information of one CSS of the two or more linked CSSs which contains CSS ID(s) of other CSS(s) of the two or more linked CSSs, and wherein the lowest-numbered PRB is a lowest-numbered PRB in the one CORESET is a CORESET associated with the one CSS.

20. The processor of claim 14, wherein the at least one controller is further configured to cause the processor to receive configuration information configuring a same lowest-numbered PRB for all of the two or more CORESETs, and wherein the lowest-numbered PRB is the same lowest-numbered PRB.

* * * * *